US011930575B2

(12) United States Patent
Diao

(10) Patent No.: US 11,930,575 B2
(45) Date of Patent: Mar. 12, 2024

(54) LAMP LIGHTING ASSEMBLY AND LIGHTING FIXTURE

(71) Applicants: OPPLE LIGHTING CO., LTD., Shanghai (CN); SUZHOU OPPLE LIGHTING CO., LTD., Suzhou (CN)

(72) Inventor: Xianjiang Diao, Suzhou (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 219 days.

(21) Appl. No.: 17/565,304

(22) Filed: Dec. 29, 2021

(65) Prior Publication Data

US 2022/0124893 A1 Apr. 21, 2022

Related U.S. Application Data

(63) Continuation of application No. PCT/CN2020/109701, filed on Aug. 18, 2020.

(30) Foreign Application Priority Data

Aug. 23, 2019 (CN) ........................ 201910785207.7
Aug. 23, 2019 (CN) ........................ 201921385280.7

(51) Int. Cl.
*H05B 45/50* (2022.01)
*F21V 23/00* (2015.01)
*H05B 45/3725* (2020.01)

(52) U.S. Cl.
CPC .......... *H05B 45/50* (2020.01); *F21V 23/006* (2013.01); *H05B 45/3725* (2020.01)

(58) Field of Classification Search
CPC .... H05B 45/30; H05B 45/37; H05B 45/3725; H05B 45/50; H05B 47/20
See application file for complete search history.

(56) References Cited

U.S. PATENT DOCUMENTS

| | | | | |
|---|---|---|---|---|
| 10,869,374 | B2 * | 12/2020 | Maeda .................. | H05B 47/24 |
| 2017/0245341 | A1 * | 8/2017 | Lee ...................... | H05B 47/20 |

(Continued)

FOREIGN PATENT DOCUMENTS

| | | | |
|---|---|---|---|
| CN | 201041939 | Y | 3/2008 |
| CN | 101345416 | A | 1/2009 |

(Continued)

OTHER PUBLICATIONS

International Search Report of PCT Application No. PCT/CN2020/109701 dated Nov. 19, 2020 with English translation, (4p).

*Primary Examiner* — Thai Pham
(74) *Attorney, Agent, or Firm* — Arch & Lake LLP

(57) ABSTRACT

The present disclosure discloses a lamp lighting assembly and lighting fixture. The lamp lighting assembly includes an anti-lightning-strike rectifier module, a high-voltage linear drive module, and a lighting module. The anti-lightning-strike rectifier module includes a first input terminal and a first output terminal, to convert an input current/input voltage of the first input terminal into a safe current/safe voltage and output the safe current/safe voltage to the first output terminal, and the anti-lightning-strike rectifier module is soldered to a pluggable fiberglass board. The high-voltage linear drive module includes a second input terminal and a second output terminal, the second input terminal is electrically connected to the first output terminal, and the second output terminal is electrically connected with the lighting module to drive the lighting module to work, and the high-voltage linear drive module and the lighting module are arranged on a substrate outside the fiberglass board.

7 Claims, 2 Drawing Sheets

(56) References Cited

U.S. PATENT DOCUMENTS

| | | | | |
|---|---|---|---|---|
| 2017/0352994 | A1 | 12/2017 | Casanova et al. | |
| 2021/0022224 | A1* | 1/2021 | Zhou | H05B 45/59 |
| 2021/0105879 | A1* | 4/2021 | Ma | F21V 23/02 |

FOREIGN PATENT DOCUMENTS

| | | | | |
|---|---|---|---|---|
| CN | 203072239 | U | * | 7/2013 |
| CN | 203072239 | U | | 7/2013 |
| CN | 208504054 | U | * | 2/2019 |
| CN | 208504054 | U | | 2/2019 |
| CN | 210405732 | U | | 4/2020 |
| CN | 216905407 | U | * | 7/2022 |

* cited by examiner

LAMP LIGHTING ASSEMBLY AND LIGHTING FIXTURE

CROSS-REFERENCE TO RELATED APPLICATIONS

This application is based upon and claims the priority of PCT patent application No. PCT/CN2020/109701 filed on Aug. 18, 2020 which claims priority to the Chinese patent application No. 201910785207.7 filed on Aug. 23, 2019, and the Chinese patent application No. 201921385280.7 filed on Aug. 23, 2019, the entire contents of which are hereby incorporated by reference herein for all purposes.

TECHNICAL FIELD

The present disclosure relates to the field of lighting equipment, in particular to a lamp lighting assembly and a lighting fixture.

BACKGROUND

The high voltage linear segmentation scheme is a mature light-emitting diode (LED) linear driving scheme in the market, which, by dividing LEDs into multiple segments, makes the corresponding LED segments conductive in turn following the ΔC input voltage, so that the input current follows the input voltage to achieve the high power factor and low harmonic value of the entire lamp.

SUMMARY

The present disclosure provides a lamp lighting assembly and a lighting fixture.

An example of the present disclosure provides a lamp lighting assembly. The lamp lighting assembly may include: an anti-lightning-strike rectifier module, a high-voltage linear drive module and a lighting module. The anti-lightning-strike rectifier module may include a first input terminal and a first output terminal, so as to convert an input current/input voltage of the first input terminal into a safe current/safe voltage and output the safe current/safe voltage to the first output terminal, and the anti-lightning-strike rectifier module is soldered to a pluggable fiberglass board; and the high-voltage linear drive module may include a second input terminal and a second output terminal, the second input terminal is electrically connected to the first output terminal, and the second output terminal is electrically connected to the lighting module to drive the lighting module to work, and the high-voltage linear drive module and the lighting module are arranged on a substrate outside the fiberglass board.

An example of the present disclosure also provides a lighting fixture. The lighting fixture may include the lamp lighting as described above. The lighting fixture may also include a lamp housing, the lamp lighting assembly is arranged within the lamp housing.

It is to be understood that both the foregoing general description and the following detailed description are exemplary and explanatory only and are not restrictive of the present disclosure.

BRIEF DESCRIPTION OF THE DRAWINGS

The drawings illustrated herein are used to provide a further understanding of the present disclosure and constitute a part of the present disclosure. The examples of the present disclosure and the descriptions thereof are used to explain the present disclosure, and do not constitute undue limiting to the present disclosure. In the drawings.

Figure 1:
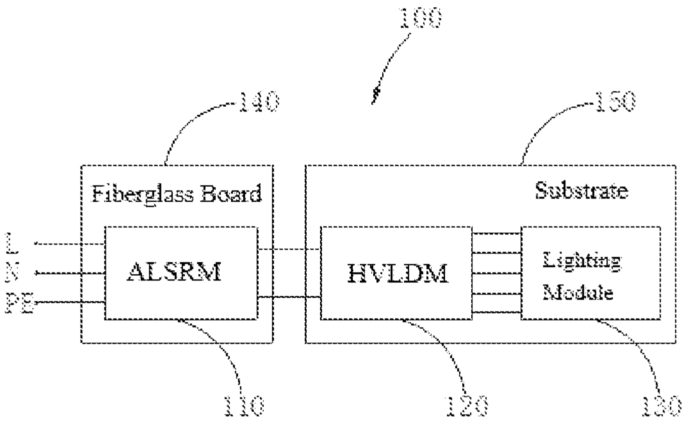
FIG. 1 is a schematically structural diagram of a lamp lighting assembly provided by an example of the present disclosure.

Reference Numerals: 100, Lamp lighting assembly; 110, Anti-lightning-strike rectifier module; 120, High-voltage linear drive module; 130, Lighting module; 140, Fiberglass board; 150, Substrate; 200, Lamp housing.

DETAILED DESCRIPTION

To make the objective, technical schemes, and advantages of the examples of the present disclosure clearer, technical schemes of the examples will be described in a clearly and fully understandable way in connection with the drawings related to the examples of the disclosure. Apparently, the described examples are just a part but not all of the examples of the disclosure. Based on the described examples herein, one of ordinary skill in the art can obtain other example(s), without any creative labor, which shall be within the scope of the present disclosure.

Sometimes, LED outdoor spotlights are used for its characteristics of low cost, small size, low height, low harmonic value, high power factor, capable of being full paste plate and the like. This scheme has weak protection against high-voltage lightning strikes, so additional anti-lightning strike elements need to be added to prevent differential-mode and common-mode high-voltage lightning strikes from damaging lighting fixtures.

In order to facilitate heat dissipation and wire arrangement, light-emitting LEDs and linear ICs need to be arranged on a same substrate. Therefore, patch type anti-lightning-strike elements are often used when lightning protection is required. However, this way will lead to a significant increase in cost.

Referring to FIG. 1, an example of the present disclosure provides a lamp lighting assembly 100 applied to a high-voltage linear segmented lighting fixture. The lamp lighting assembly 100 includes an anti-lightning-strike rectifier module (ALSRM) 110, a high-voltage linear drive module (HVLDM) 120, and a lighting module 130. The high-voltage linear drive module 120 includes a first input terminal and a first output terminal, so as to convert an input current/input voltage of the first input terminal into a safe current/safe voltage, and output the safe current/safe voltage to the first output terminal, in which the anti-lightning-strike rectifier module is soldered to a pluggable fiberglass board 140. The high-voltage linear drive module 120 includes a second input terminal and a second output terminal, the second input terminal is electrically connected to the first output terminal, and the second output terminal is electrically connected to the lighting module 130 to drive the lighting module 130 to work, in which the high-voltage linear drive module 120 and the lighting module 130 are arranged on a substrate 150 outside the fiberglass board 140.

The high-voltage linear drive module 120 is used to convert the input current/input voltage of the first input terminal into a safe current/safe voltage, and output the safe current/safe voltage to the first output terminal, which can employ, but is not limited to, IC-DT3100, SM2082D, SDS3108 chips, etc., which are not specifically limited in the examples of the present disclosure.

The high-voltage linear drive module 120 and the lighting module 130 are both arranged on a substrate 150 outside the fiberglass board 140 to facilitate heat dissipation and wire arrangement. The substrate 150 is an aluminum substrate. According to actual conditions, the high-voltage linear drive module 120 and the lighting module 130 can be arranged on the same substrate 150 or on different substrates 150, respectively.

The anti-lightning-strike rectifier module 110 is soldered to the pluggable fiberglass board 140. Specifically, the fiberglass board 140 is used as a printed board and circuit connection wires and inserting holes are designed on the fiberglass board 140. Pins of the anti-lightning-strike rectifier module 110 are inserted into the pre-designed inserting holes in the fiberglass board, and after temporary fixation, the inserted pins are soldered on the side, facing away from the anti-lightning-strike rectifier module 110, of the fiberglass board 140. Soldering process may be, but is not limited to, wave soldering, dip soldering or the like. Wave soldering is employed in the examples of the present disclosure.

Soldering the anti-lightning-strike rectifier module 110 to the pluggable fiberglass board 140 by the wave soldering can greatly reduce the cost of lightning protection on the basis of ensuring heat dissipation and wiring convenience, as compared to the traditional lightning protection method of pasting patch.

Figure 2:
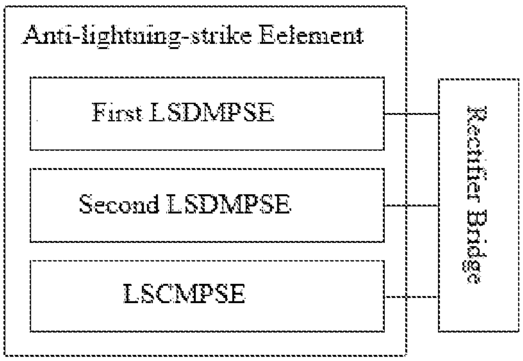
FIG. 2 is a schematic block diagram of a anti-lightning-strike element provided by an example of the present disclosure.

The anti-lightning-strike rectifier module 110 is used to protect the lighting module 130 from lightning strikes. Referring to FIG. 2, the anti-lightning-strike rectifier module 110 includes an anti-lightning-strike element and a rectifier bridge that are electrically connected. Among them, the anti-lightning-strike element is used to protect the lighting module 130 from lightning, and the rectifier bridge is used to convert the input alternating current into the direct voltage required by the lighting module 130 to work. The lighting module 130 may be, but is not limited to, an LED lamp, an OLED lamp, etc. As an example, the lighting module 130 in the example of the present disclosure adopts an LED lamp.

Figure 3:
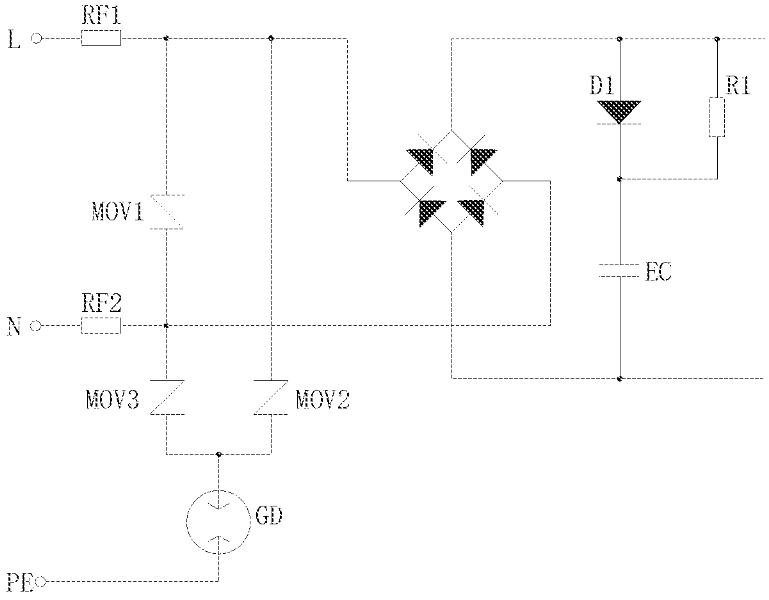
FIG. 3 is a schematic circuit diagram of the anti-lightning-strike element provided by an example of the present disclosure.

Referring to FIGS. 2 and 3, the anti-lightning-strike element includes a first lightning strike differential-mode protection sub-element (LSDMPSE), a second lightning strike differential-mode protection sub-element and a lightning strike common-mode protection sub-element (LSCMPSE) that are respectively electrically connected with the rectifier bridge. Among them, the first lightning strike differential-mode protection sub-element is used as the first protection for the input AC differential-mode high voltage to absorb most of the high voltage, and the second lightning strike differential-mode protection sub-element is used to absorb the residual voltage by passing the first lightning strike differential-mode protection sub-element. The lightning strike common-mode protection sub-element is used to absorb alternating current (AC) common-mode high voltage when there is a high voltage lightning strike.

As shown in FIG. 3, the first lightning strike differential-mode protection sub-element includes a first fusible resistor RF1, a second fusible resistor RF2, and a first varistor MOV1, the first fusible resistor RF1 is connected between a live wire and the first input terminal of the rectifier bridge, the second fusible resistor RF2 is connected between a neutral wire and the second input terminal of the rectifier bridge, and the first varistor MOV1 is connected with the rectifier bridge in parallel between the first fusible resistor RF1 and the second fusible resistor RF2.

The second lightning strike differential-mode protection sub-element includes a discharge resistor R1, a diode D1, and an electrolytic capacitor EC. The diode D1 is connected with the discharge resistor R1 in parallel to form a parallel circuit. The parallel circuit is connected with the electrolytic capacitor EC in series and then connected with the rectifier bridge in parallel between the two input terminals of the high-voltage linear drive module 120, and a cathode of the diode D1 is connected to the electrolytic capacitor EC. The two output terminals of the rectifier bridge are connected with the two input terminals of the high-voltage linear drive module 120 in a one-to-one correspondence.

The lightning strike common-mode protection sub-element includes a gas discharge tube GD, a second varistor MOV2 and a third varistor MOV3. The second varistor MOV2 is connected with the third varistor MOV3 in parallel between the rectifier bridge and the gas discharge tube GD that is grounded, the second varistor MOV2 is connected with the first input terminal of the rectifier bridge, and the third varistor MOV3 is connected with the second input terminal of the rectifier bridge.

In the anti-lightning-strike process by the anti-lightning-strike rectifier module 110, when differential-mode high voltage lightning strikes enter the anti-lightning-strike rectifier module 110 through the power input terminal, most of the high voltage are firstly consumed and absorbed by the first fusible resistor RF1, the first varistor MOV1, and the second varistor RF2. The residual voltage enters the second lightning strike differential-mode protection sub-element through the rectifier bridge, and is absorbed by the diode D1 and the electrolytic capacitor EC, and become a safe voltage. The discharge resistor R1 is used to discharge the charges stored in electrolytic capacitor EC after the lightning strike high voltage is absorbed by the electrolytic capacitor EC. When there is a high voltage lightning strike from the live wire to the ground, the high voltage is absorbed by the first fusible resistor RF1, the second varistor MOV2, and the gas discharge tube GD, and become a safe voltage. When there is a high voltage lightning strike from the neutral wire to the ground, the high voltage is absorbed by the second fusible resistor RF2, the third varistor MOV3, and the gas discharge tube GD, and become a safe voltage.

In the examples of the present disclosure, the anti-lightning-strike element includes a first lightning strike differential-mode protection sub-element, a second lightning strike differential-mode protection sub-element, and a lightning strike common-mode protection sub-element. It can be appreciated that, in some other examples, the anti-lightning-strike element may be selected from one or more of the first lightning strike differential-mode protection sub-element, the second lightning strike differential-mode protection sub-element, and the lightning strike common-mode protection sub-element as required. For example, generally in areas with low anti-lightning-strike requirements (differential-mode <2 KV, and common-mode <4 KV), the anti-lightning-strike element can be selected one from the first lightning strike differential-mode protection sub-element and the second lightning strike differential-protection sub-element as required, and no lightning strike common-mode protection sub-element is provided. In areas with high anti-lightning-strike requirements (differential-mode >2 KV, and common-mode >4 KV), the first lightning strike differential-mode protection sub-element, the second lightning strike differential-mode protection sub-element, and the lightning strike common-mode protection sub-element are all required. In this way, the anti-lightning-strike element can be flexibly arranged according to actual lightning protection requirements, thereby reducing product costs.

Figure 4:
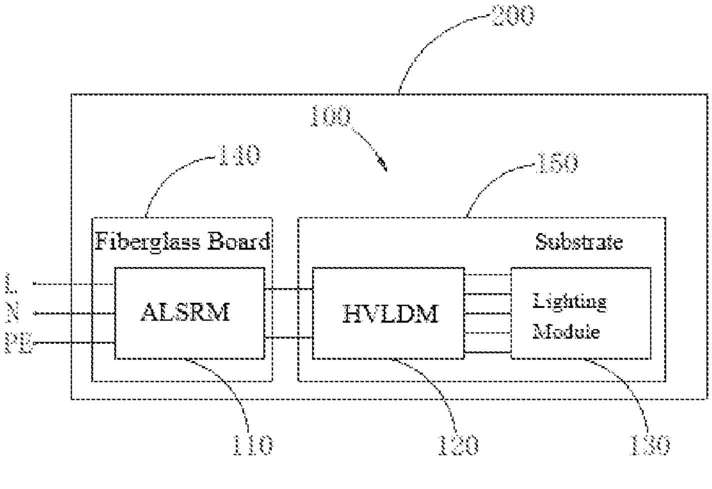
FIG. 4 is a schematically structural diagram of a lighting fixture provided by an example of the present disclosure.

Referring to FIG. 4, the examples of the present disclosure also provide a lighting fixture including any one of the lamp lighting assemblies 100 described above and a lamp housing 200 within which the lamp lighting assembly 100 is arranged.

Briefly, for the lamp lighting assembly 100 and the lighting fixture provided by the examples of the present disclosure, the high-voltage linear drive module (HVLDM) 120 and the lighting module 130 are arranged on the substrate 150 to facilitate heat dissipation and wire arrangement. At the same time, soldering the anti-lightning-strike rectifier module (ALSRM) 110 to the pluggable fiberglass board 140 can reduce the cost of anti-lightning-strike while ensuring that the heat dissipation and wiring convenience. In addition, in the lighting circuit and lighting fixture provided by the examples of the present disclosure, the anti-lightning-strike element on the anti-lightning-strike rectifier module is selectable, and the anti-lightning-strike element can be flexibly arranged according to the actual lightning protection requirements, thereby further reducing the cost of anti-lightning strike.

Examples of the present disclosure employs following technical schemes.

An example of the present disclosure provides a lamp lighting assembly, comprising: an anti-lightning-strike rectifier module, a high-voltage linear drive module and a lighting module. The anti-lightning-strike rectifier module includes a first input terminal and a first output terminal, so as to convert an input current/input voltage of the first input terminal into a safe current/safe voltage and output the safe current/safe voltage to the first output terminal, and the anti-lightning-strike rectifier module is soldered to a pluggable fiberglass board; and the high-voltage linear drive module includes a second input terminal and a second output terminal, the second input terminal is electrically connected to the first output terminal, and the second output terminal is electrically connected to the lighting module to drive the lighting module to work, and the high-voltage linear drive module and the lighting module are arranged on a substrate outside the fiberglass board.

Optionally, the anti-lightning-strike rectifier module comprises a anti-lightning-strike element and a rectifier bridge that are electrically connected.

Optionally, the anti-lightning-strike element includes at least one of a first lightning strike differential-mode protection sub-element, a second lightning strike differential-mode protection sub-element and a lightning strike common-mode protection sub-element.

Optionally, the anti-lightning-strike element comprises the first lightning strike differential-mode protection sub-element, the first lightning strike differential-mode protection sub-element includes a first fusible resistor, a second fusible resistor, and a first varistor, the first fusible resistor is connected between a live wire and the first input terminal of the rectifier bridge, the second fusible resistor is connected between a neutral wire and the second input terminal of the rectifier bridge, and the first varistor is connected with the rectifier bridge in parallel between the first fusible resistor and the second fusible resistor.

Optionally, the anti-lightning-strike element comprises the second lightning strike differential-mode protection sub-element including a discharge resistor, a diode, and an electrolytic capacitor, the diode is connected with the discharge resistor in parallel to form a parallel circuit, the parallel circuit is connected with the electrolytic capacitor in series and then connected with the rectifier bridge in parallel between the two input terminals of the high-voltage linear drive module, and a cathode of the diode is connected with the electrolytic capacitor.

Optionally, the anti-lightning-strike element comprises the lightning strike common-mode protection sub-element including a gas discharge tube, a second varistor, and a third varistor, and the second varistor is connected with the third varistor in parallel between the rectifier bridge and the gas discharge tube that is grounded.

Optionally, the lighting module is an LED lamp.

Optionally, the lamp lighting assembly further comprising a substrate, and the high-voltage linear drive module and the lighting module are both arranged on the same An example of the present disclosure also provides a lighting fixture, comprising any of the lamp lighting assemblies, and it further comprises a lamp housing, the lamp lighting assembly is arranged within the lamp housing.

The above-described at least one technical solution adopted by the examples of the present disclosure can achieve the following beneficial effects.

The lighting circuits and lighting fixtures provided by the examples of the present disclosure can reduce the cost of lightning protection while ensuring the heat dissipation and the wiring convenience.

For the lighting circuits and lighting fixtures provided by the examples of the present disclosure, the anti-lightning-strike element on the anti-lightning-strike rectifier module is optional and can be flexibly configured according to market requirements, which can further reduce the cost of anti-lightning-strike.

In the description of the present disclosure, it should also be noted that, unless otherwise specified and defined, the terms “arranged”, “installed”, “connected”, and “connecting” should be understood in a broad sense. For example, they may be connected fixedly, detachably, or integrally; they may be connected mechanically or electrically; they may be connected directly, or indirectly by an intermediate medium, or they can be internal communication between two elements. For those skilled in the art, the specific meanings of the above-described terms in the present disclosure can be understood in specific circumstances. In addition, the terms “first”, “second”, “third”, etc. are only used for distinguishing the descriptions, and cannot be understood as indicating or implying relative importance.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The above descriptions are only examples of the present application, and are not intended to limit the present disclosure. For those skilled in the art, the present disclosure can have various modifications and changes. Any modification, equivalent substitutions, improvement, etc. made within the spirit and principle of the present disclosure shall be included in the scope of the present disclosure.

What is claimed is:

1. A lamp lighting assembly, comprising an anti-lightning-strike rectifier module, a high-voltage linear drive module and a lighting module, wherein:

the anti-lightning-strike rectifier module comprises a first input terminal an anti-lightning-strike element, a rectifier bridge, and a first output terminal, so as to convert an input current/input voltage of the first input terminal into a safe current/safe voltage and output the safe current/safe voltage to the first output terminal, and the anti-lightning-strike rectifier module is soldered to a pluggable fiberglass board, wherein the anti-lightning-strike element comprises a first lightning strike differential-mode protection sub-element, a second lightning strike differential-mode protection sub-element and a lightning strike common-mode protection sub-element that are respectively electrically connected with the rectifier bridge; and the high-voltage linear drive module comprises a second input terminal and a second output terminal, the second input terminal is electrically connected to the first output terminal, and the second output terminal is electrically connected to the lighting module to drive the lighting module to work, and the high-voltage linear drive module and the lighting module are arranged on a substrate outside the fiberglass board.

2. The lamp lighting assembly according to claim 1, wherein the anti-lightning-strike element comprises the first lightning strike differential-mode protection sub-element, the first lightning strike differential-mode protection sub-element includes a first fusible resistor, a second fusible resistor, and a first varistor, the first fusible resistor is connected between a live wire and the first input terminal of the rectifier bridge, the second fusible resistor is connected between a neutral wire and the second input terminal of the rectifier bridge, and the first varistor is connected with the rectifier bridge in parallel between the first fusible resistor and the second fusible resistor.

3. The lamp lighting assembly according to claim 1, wherein the anti-lightning-strike element comprises the second lightning strike differential-mode protection sub-element including a discharge resistor, a diode, and an electrolytic capacitor, the diode is connected with the discharge resistor in parallel to form a parallel circuit, the parallel circuit is connected with the electrolytic capacitor in series and then connected with the rectifier bridge in parallel between the two input terminals of the high-voltage linear drive module, and a cathode of the diode is connected with the electrolytic capacitor.

4. The lamp lighting assembly according to claim 1, wherein the anti-lightning-strike element comprises the lightning strike common-mode protection sub-element including a gas discharge tube, a second varistor, and a third varistor, and the second varistor is connected with the third varistor in parallel between the rectifier bridge and the gas discharge tube that is grounded.

5. The lamp lighting assembly according to claim 1, wherein the lighting module is an LED lamp.

6. The lamp lighting assembly according to claim 1, wherein the high-voltage linear drive module and the lighting module are both arranged on the same substrate.

7. A lighting fixture, comprising a lamp lighting assembly a lamp housing, wherein the lamp lighting assembly is arranged within the lamp housing, and the lamp lighting assembly comprises an anti-lightning-strike rectifier module, a high-voltage linear drive module and a lighting module, wherein:

the anti-lightning-strike rectifier module comprises a first input terminal an anti-lightning-strike element, a rectifier bridge, and a first output terminal, so as to convert an input current/input voltage of the first input terminal into a safe current/safe voltage and output the safe current/safe voltage to the first output terminal, and the anti-lightning-strike rectifier module is soldered to a pluggable fiberglass board, wherein the anti-lightning-strike element comprises a first lightning strike differential-mode protection sub-element, a second lightning strike differential-mode protection sub-element and a lightning strike common-mode protection sub-element that are respectively electrically connected with the rectifier bridge; and the high-voltage linear drive module comprises a second input terminal and a second output terminal, the second input terminal is electrically connected to the first output terminal, and the second output terminal is electrically connected to the lighting module to drive the lighting module to work, and the high-voltage linear drive module and the lighting module are arranged on a substrate outside the fiberglass board.

* * * * *